US 6,534,555 B1

(12) United States Patent
Rister, Jr. et al.

(10) Patent No.: US 6,534,555 B1
(45) Date of Patent: Mar. 18, 2003

(54) CATALYST SYSTEMS FOR POLYURETHANE POLYESTER FOAMS

(75) Inventors: Ernest L. Rister, Jr., Round Rock, TX (US); Robert A. Grigsby, Jr., Austin, TX (US); Robert L. Zimmerman, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 33 days.

(21) Appl. No.: 09/950,133

(22) Filed: Sep. 10, 2001

(51) Int. Cl.[7] .......................... C08G 18/18; B01J 27/24
(52) U.S. Cl. ................... 521/115; 502/167; 502/200; 521/116; 521/117; 521/118; 521/128; 521/129; 521/163; 521/164; 521/167; 521/170; 521/172; 521/173; 521/174
(58) Field of Search ................ 502/167, 200; 521/115, 116, 117, 118, 128, 129, 163, 164, 167, 170, 172, 173, 174

(56) References Cited

U.S. PATENT DOCUMENTS

| | | | |
|---|---|---|---|
| 4,122,038 A | 10/1978 | Sandner et al. | 252/431 |
| 4,184,023 A | 1/1980 | Cuscurida | 521/129 |
| 4,186,254 A | 1/1980 | Cuscurida et al. | 521/115 |
| 4,194,069 A | 3/1980 | Speranza et al. | 521/129 |
| 4,217,247 A | 8/1980 | Szabat et al. | 252/431 C |
| 4,228,248 A | 10/1980 | Zimmerman | 521/115 |
| 4,237,282 A | 12/1980 | Speranza et al. | 544/168 |
| 4,297,443 A | 10/1981 | Eckler et al. | 521/129 |
| 4,312,959 A | 1/1982 | Treadwell et al. | 521/107 |
| 4,348,536 A * | 9/1982 | Blahak et al. | 560/169 |
| 4,353,995 A | 10/1982 | Szabat et al. | 521/125 |
| 4,376,832 A | 3/1983 | Speranza et al. | 521/115 |
| 4,379,757 A | 4/1983 | Baskent et al. | 252/426 |
| 4,380,591 A | 4/1983 | Baskent et al. | 521/115 |
| 4,404,121 A | 9/1983 | Klein et al. | 252/426 |
| 4,426,301 A | 1/1984 | Dexheimer et al. | 252/8.9 |
| 4,426,320 A | 1/1984 | Ernest et al. | 502/313 |
| 4,463,050 A | 7/1984 | Zimmerman | 428/318.8 |
| 4,465,791 A | 8/1984 | Klein et al. | 521/115 |
| 4,468,478 A | 8/1984 | Dexheimer et al. | 521/125 |
| 4,789,689 A | 12/1988 | Zimmerman et al. | 521/115 |
| 5,039,713 A | 8/1991 | Petrella | 521/129 |
| 5,057,480 A | 10/1991 | Petrella | 502/167 |
| 5,086,081 A | 2/1992 | Savoca et al. | 521/103 |
| 5,130,403 A | 7/1992 | Savoca et al. | 528/48 |
| 5,143,944 A | 9/1992 | Savoca et al. | 521/129 |
| 5,162,379 A | 11/1992 | Savoca et al. | 521/103 |
| 5,166,223 A | 11/1992 | Savoca et al. | 521/103 |
| 5,168,009 A | 12/1992 | Petrella et al. | 428/313.5 |
| 5,177,046 A | 1/1993 | Savoca et al. | 502/167 |
| 5,194,609 A | 3/1993 | Savoca et al. | 544/193 |
| 5,212,306 A | 5/1993 | Savoca et al. | 544/193 |
| 5,229,430 A | 7/1993 | Tamano et al. | 521/129 |
| 5,233,039 A | 8/1993 | Listemann et al. | 544/193 |
| 5,238,894 A | 8/1993 | Savoca et al. | 502/167 |
| 5,248,646 A | 9/1993 | Savoca et al. | 502/167 |
| 5,308,882 A | 5/1994 | Washington | 521/115 |
| 5,322,940 A | 6/1994 | Savoca et al. | 544/193 |
| 5,356,942 A | 10/1994 | Savoca et al. | 521/103 |
| 5,374,666 A | 12/1994 | Tamano et al. | 521/129 |
| 5,508,314 A | 4/1996 | Listemann et al. | 521/115 |
| 5,512,603 A | 4/1996 | Carr et al. | 521/118 |
| 5,539,007 A | 7/1996 | Listemann et al. | 521/103 |
| 5,559,161 A | 9/1996 | Klotz et al. | 521/129 |
| 5,591,780 A * | 1/1997 | Muha et al. | 521/128 |
| 5,633,293 A | 5/1997 | Van Court Carr et al. | 521/118 |
| 5,710,191 A | 1/1998 | Listemann et al. | 521/118 |
| 5,859,079 A | 1/1999 | Mercando et al. | 521/129 |
| 5,902,835 A | 5/1999 | Meier et al. | 521/125 |
| 6,114,403 A | 9/2000 | Mercan do et al. | 521/128 |
| 6,201,033 B1 | 3/2001 | Mercando et al. | 521/129 |
| 6,232,356 B1 | 5/2001 | Mercando et al. | 521/129 |
| 6,458,860 B1 * | 10/2002 | Humbert et al. | 521/115 |

* cited by examiner

*Primary Examiner*—John M. Cooney, Jr.
(74) *Attorney, Agent, or Firm*—Russell R. Stolle; Ron D. Brown; Christopher J. Whewell

(57) ABSTRACT

Provided are catalyst systems which produce flexible polyurethane polyester foams that are color stable, are lower in odor, and uses less catalysts than current most commonly practiced technology. The use of lower amounts of catalysts with low vapor pressure reduces worker exposure to alkaline corrosive materials, reduces pollution through less pounds of volatile organic chemicals (VOC's) and is less expensive.

23 Claims, No Drawings

CATALYST SYSTEMS FOR POLYURETHANE POLYESTER FOAMS

FIELD OF THE INVENTION

This invention relates to catalyst systems useful in producing flexible polyurethane polyester foams. More particularly, it relates to catalysts for producing low-odor foams which are not prone to discoloration, and which have a low volatile organic chemical content.

BACKGROUND INFORMATION

Flexible polyurethane polyester foams require unique catalysts to produce stable low-color foams. These catalysts are normally weak blowing catalysts such as n-ethyl morpholine and N-methyl morpholine. These weak blowing catalysts have very high vapor pressure. This results in high amounts of odor in the foam and in the production area. Since these catalysts are relatively weak in activity, relatively large amounts are required to produce stable foam at a reasonable production rate. The large amount of such catalyst that is required to be used further compounds the odor problems associated with the use of these catalysts. The use of strong gel catalysts such as 1,4-diazabicyclo[2,2,2] octane is not normally practiced since the amount required to give the proper initiation or cream time also results in tight foam that shrinks on storage. The above-mentioned morpholine-based catalysts produce white foams and color stable foams when employing certain reactant dyes.

Another weak blowing catalyst, methoxyethyl morpholine, may be used to produce ester foams, however the amount required is more twice that of N-ethyl morpholine. The foams produced are lower in odor due to the lower vapor pressure of methoxyethylmorpholine, but unfortunately the foams discolor or turn pink during curing. Combinations of gel catalysts such as N,N-dimethylpiperazine and weak blowing catalysts such as Dimorpholinodiethylether have been practiced. Unfortunately these combinations produce foams that pink. Additionally, N,N-dimethylpiperazine has a high vapor pressure. While the use of N,N-dimethylpiperazine does produce lower odor foams than N-ethylmorpholine or N-methylmorpholine, this catalyst combination still produces a significant amount of VOC and odor in the foam production area. The use of a strong gel catalyst such as N,N-Bis[3-(dimethylamino)propyl] formamide can be used to replace the highly volatile dimethylpiperazine. Unfortunately the use of N,N-Bis[3-(dimethylamino)propyl]formamide as the sole catalyst produces a tight foam that displays the "finger nail" effect, whereby the foam does not recover completely following its indention with a fingernail or other sharp object.

INVENTION SUMMARY

We have discovered that catalyst compositions which comprise combinations of a weak blowing catalyst, such as methoxyethylmorpholine, and a strong gelling catalyst, such as N,N-bis[3-(dimethylamino)propyl]formamide, produce color-stable foams with reactant dyes, and produce foams that do not take on a pink shade of color or scorch in the absence of dyes, while being possessive of a reduced level of odors and emissions during the foaming process over foams using prior-art catalysts. Optionally, a strong blowing catalyst such as 2,2'-oxybis(N,N-dimethylethanamine) and/or 2-((2-(dimethylamino)ethoxy)ethyl)methyl-amino)-ethanol can be incorporated to adjust initiation and rise time. The incorporation of such optional strong blowing catalysts further reduces odors and VOC's due to reduced amounts of catalyst needed to achieve the desired reactivity. 2,2'-oxybis(N,N-dimethylethanamine) is available from Huntsman Petrochemical Corporation of Austin, Tex. under the trade name JEFFCAT® ZF-20 catalyst, and or 2-((2-(dimethylamino) ethoxy)ethyl)methyl-amino)-ethanol is available from Huntsman Petrochemical Corporation of Austin, Tex. under the trade name JEFFCAT® ZF-10 catalyst.

DETAILED DESCRIPTION

Many catalysts are known as being useful in producing various polyurethane-bearing foam products. Some of the known catalysts are described in the following U.S. patents, the entire contents of each of which are fully incorporated herein by reference thereto: U.S. Pat. Nos. 6,232,356; 6,201,033; 6,114,403; 5,902,835; 5,859,079; 5,710,191; 5,633,293; 5,559,161; 5,539,007; 5,512,603; 5,508,314; 5,374,666; 5,356,942; 5,322,940; 5,308,882; 5,248,646; 5,238,894; 5,233,039; 5,229,430; 5,212,306; 5,194,609; 5,177,046; 5,168,009; 5,166,223; 5,162,379; 5,143,944; 5,130,403; 5,086,081; 5,057,480; 5,039,713; 4,789,689; 4,468,478; 4,465,791; 4,463,050; 4,426,320; 4,426,301; 4,404,121; 4,380,591; 4,379,757; 4,376,832; 4,353,995; 4,312,959; 4,297,443; 4,237,282; 4,228,248; 4,217,247; 4,194,069; 4,186,254; 4,184,023; and 4,122,038. In general, catalysts for polyurethane foams are classifiable as either blowing catalysts or gelling catalysts, depending on their relative catalytic activity respecting either generation of $CO_2$ via the water/isocyanate interaction or the gelling reaction via the OH/isocyanate interaction. Generally, catalysts with a 3-atom spacing between active sites (viz. N, O) function predominantly as gelling catalysts, while catalysts with a 2-atom spacing between active sites (viz. N, O) function predominantly as blowing catalysts. Blowing catalysts and gelling catalysts are classified by those skilled in the art as either weak or strong, depending on the relative vigor with which they catalyze the blowing or gelling reaction.

According to the present invention, a weak blowing catalyst is combined with a strong gelling catalyst. The weak blowing catalyst used in accordance with one preferred form of the invention is methoxyethylmorpholine. The strong gelling catalyst used in accordance with the same preferred form of the invention is N,N-bis[(3-dimethylamino)propyl] formamide, which conforms to the chemical structure:

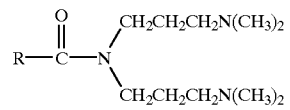

when R is a hydrogen atom. However, R may be any alkyl, cycloalkyl, aryl, or alkylaryl group having from 1 to 20 carbon atoms, whether straight-chain, branched, saturated, or unsaturated. A catalyst composition according to the invention may optionally contain a strong blowing catalyst selected from the group consisting of: 2,2'-oxybis(N,N-dimethylethanamine) and/or 2-((2-(dimethylamino)ethoxy) ethyl)methyl-amino)-ethanol.

The catalyst systems of the present invention are useful in the manufacture of flexible polyurethane polyester foams, and are especially useful in areas that require less odor and/or emissions. The catalyst combination is also useful as a co-catalyst in combination with other catalyst systems to improve flow, skin cure, and de-mold times in flexible molded polyether foams, or to replace N-ethyl morpholine or catalyst combinations that contain N,N-dimethylpiperazine such as JEFFCAT® DM-70.

One very surprising and unexpected result of the combination of the catalyst components to provide a catalyst combination according to the invention is that low-odor foams that show no pinking can bee obtained with the combination of a blowing catalyst (such as methoxyethylmorpholine) and N,N-Bis[3-(dimethylamino)propyl]formamide. This is unexpected because foams produced with a weak blowing catalyst such as methoxyethylmorpholine or dimorpholinoethylether alone produce foam which turns pink ("pinking"). Further, foams produced with a weak blowing catalyst (such as dimorpholinoethylether) in combination with a strong blowing catalyst (such as dimethylpiperazine) produce pink foams. According to the invention, the combination of methoxyethylmorpholine and N,N,-Bis[3-(dimethylamino)propyl]formamide surprisingly provided flexible polyurethane polyester foams which did not discolor or exhibit pinking. Curiously, the use of N,N-Bis[3-(dimethylamino)propyl]formamide as the sole catalyst gave a slightly tight foam that exhibited the phenomenon of "finger nail", while the combination of a weak blowing catalyst like methoxyethylmorpholine or strong blowing catalyst like bisdimethylaminoethylether (JEFFCAT® ZF-20) and the formamide gave an open foam that did not exhibit "finger nailing" (the "finger nail" phenomenon is easily observable in certain foams, and is where foams are compressed with the fingers for a few seconds, and released. Foams are said to "finger nail" if the impressions of the fingers remain in the foam after the compression is released. It is a type of compression set.) Foams which exhibit fingernailing are only of limited commercial value.

Foams are often classified by those skilled in the art as being either open or closed foams. An open foam is one which the cell walls have ruptured, thus allowing the flow of air through the foam, while a closed foam is one which the cell walls are intact, and do not allow air to flow through the foam. In a flexible foam, a high content of closed cells causes the foam to shrink.

Foams are also often classified by those skilled in the art as being either "tight" or "open" foams. A tight foam is one which there is a significant amount of closed cells thus now allowing for free air flow, while a open foam is one which a significant percent of the cell walls have ruptured thus allowing excellent airflow through the foam.

Foams are often classified by those skilled in the art as being either "white" or "pink" foams. A white foam is one in which the foam has not discolored and appears white in color, while a pink foam is one that has a pink hue. This is observed most often in the center of the foam where the reaction temperature is higher due to the insulating properties of the foam.

Foams are often classified by those skilled in the art as being either "low-odor" or "high-odor" foams. A low-odor foam is one which has no apparent odor, while a high-odor foam is one which emits an odor which is noticeable. In those cases where amines are used as catalysts, the odor is often described as being "fish-like".

Using a catalyst according to the invention for preparing a polyurethane polyester flexible foam yields foams which are: 1) open celled; 2) low-odor; 3) are low in VOC content; and 4) do not show a pink color.

Polyols useful in providing a polyurethane foam according to the present invention include polyester polyols having 2 or more reactive hydroxyl groups. Polyester polyols include those which are produced from a dibasic acid and a polyhydric alcohol such as, for example, polyethyleneadipate, polybutylene adipate and polyethyleneterephthalates which may include those products reclaimed from waste materials. Any polyol may be used in accordance with the present invention, provided that it is based on a dibasic acid or anhydride and glycol (alcohol) with a functionality of 2.0 or more. Suitable dibasic acids include without limitation: adipic, succinic, glutaric phthalic, terephthalic, or mixtures of the foregoing. Suitable polyhydric alcohols include without limitation: ethylene glycol, propylene glycol, diethylene glycol, triethylene glycol, tetraethylene glycol, dipropylene glycol, tripropylene glycol and higher glycols of propylene, butylene glycol, dibutylene glycol, 1–6, hexanediol, 1,4-butanediol, 1,5 pentanediol, glycerol, trimethylolpropane, and methylglucosides.

Various surfactants, colors and dyes, other tertiary amines, metal catalysts, isocyanates, fire retardants, antistatic agents, coupling agents and other chemicals known by those skilled in the art as being useful in the production of urethane foams are suitable for inclusion when making a foam using a catalyst combination disclosed herein.

One preferred temperature at which polyurethane foams may be produced in accordance with the invention is room temperature; however, the temperature at which foams may be produced within the scope of the present invention may be any temperature in the range from about 15° C. to about 50° C. The pressure range is preferably ambient but any pressure in the range of from about 0.5 atmospheres to about 1.5 atmospheres is suitable for providing a polyurethane polyester foam using a catalyst combination disclosed herein.

In table I below are listed the formulations of various foams:

TABLE I

| Formulation | foam formulations and properties |||||||||| 
|---|---|---|---|---|---|---|---|---|---|---|
| | 1 | 2 | 3 | 4 | 5 | 6 | 7 | 8 | 9 | 10 |
| LEXOREZ ® | 100 | 100 | 100 | 100 | 100 | 100 | 100 | 100 | 100 | 100 |
| TEGOSTAB ® B-8300 | 1.4 | 1.4 | 1.4 | 1.4 | 1.4 | 1.4 | 1.4 | 1.4 | 1.4 | 1.4 |
| DABCO ® B-16 | 0.3 | 0.3 | 0.3 | 0.3 | 0.3 | 0.3 | 0.3 | 0.3 | 0.3 | 0.3 |
| Water | 4.2 | 4.2 | 4.2 | 4.2 | 4.2 | 4.2 | 4.2 | 4.2 | 4.2 | 4.2 |
| REACTINT ® Blue X3LV | — | — | — | — | — | — | — | 0.5 | 0.5 | 0.5 |
| N-ethylmorpholine | 2.0 | — | — | — | — | — | — | — | — | — |
| bisdimethylaminoethylether | — | — | — | — | — | — | 0.12 | — | — | 0.165 |
| N-methoxyethyl morpholine | — | 5.4 | — | — | — | — | 0.56 | 0.62 | 0.33 | — |
| N,N-bis[3-(dimethylamino) propyl] formamide | — | — | 0.7 | — | — | — | 0.12 | 0.62 | 0.765 | 0.385 |
| Catalyst Blend #1 | — | — | — | 1.7 | — | — | — | — | — | — |

TABLE I-continued foam formulations and properties

| Formulation | 1 | 2 | 3 | 4 | 5 | 6 | 7 | 8 | 9 | 10 |
|---|---|---|---|---|---|---|---|---|---|---|
| Catalyst Blend #2 | — | — | — | — | 1.1 | — | — | — | — | — |
| Catalyst Blend #3 | — | — | — | — | — | 1.175 | — | — | — | — |
| Toluene di-isocyanate | 50.3 | 50.3 | 50.3 | 50.3 | 50.3 | 50.3 | 50.3 | 50.3 | 50.3 | 50.3 |
| Cream time (sec.) | 12 | 12 | 12 | 12 | 12 | 12 | 12.5 | 12 | 12 | 11 |
| Rise time (sec.) | 62 | 65 | 63 | 65 | 63 | 65 | 81 | 62 | 60 | 61 |
| color (w = white; p = pink; B = blue) | w | p | w | w | w | w | w | B | B | B |
| low-odor = L; high odor = H | H | L | L | L | L | L | L | L | L | L |
| tight = T; open = O | O | O | T | O | O | O | O | O | O | O |
| Air Flow (SCFH) | 19.0 | 18.3 | 2.0 | 4.2 | 2.7 | 2.3 | — | 2.2 | 3.2 | 2.5 |

LEXOREZ ® 1102-50A is a diethylene glycol adipate polyester polyol OH number 52 mg/KOH per gram manufactured by Inolex Corporation of Philadelphia, PA.
TEGOSTAB ® B-8300 is a silicone surfactant manufactured by T. H. Goldschmidt Corporation of Hopewell, Va.
DABCO ® B-16 is dimethylcetylamine sold by Air Products Corporation of Allentown, Pa.
REACTINT ® Blue X3LV is a reactant dye sold by Milliken Chemical of Spartanburg, S.C.
Toluene Diisocyanate ("TDI") is manufactured by Huntsman Polyurethanes, Dow, Bayer and others.
The TDI used in these examples is TDI 80/20 isomers however TDI 65/35 is also useful).
Catalyst Blend #1 is 70% methoxyethylmorpholine 30% N,N-Bis[3-(dimethylamino)propyl]formamide.
Catalyst Blend #2 is 70% methoxyethylmorpholine 15% Bisdimethylaminoethylether and 15% N,N-Bis[3-(dimethylamino)propyl]formamide.
Catalyst Blend #3 is 70% methoxyethylmorpholine, 10% Bisdimethylaminoethylether, and 20% N,N-Bis[3-(dimethylamino)propyl]formamide.

The foams in Table I were generally made by conventional fashion, by combining "Part A" and "Part B" formulation subcombinations with each other at ambient temperature and pressure, with sufficient agitation, wherein the Part A comprised the organic di-isocyanate component, and wherein the Part B comprised the remaining components. Typically, in the art, the Part B comprises an organic polyol and a catalyst, and may optionally contain such other components which are well-known by those skilled in the art as being suitable for inclusion in polyurethanes or polyurethane foams, such as plasticizers, surfactants, other catalysts, colorants, dyes, water, etc. Specifically, the foams in each formulation were made by placing all of the ingredients of a given formulation (the "resin component"), excepting the isocyanate, into a 32 ounce wax coated paper cup. The resin component was mixed for 15 seconds using a high shear mechanical mixer. The isocyanate was added to the mixture, and the mixture was quickly mixed with the high shear mechanical mixer for an additional 8 seconds. The mixture was then poured into a 14"×14" by 6" cake box. The start of the rise, known as the cream time, was recorded with the aid of a stop-watch. The time of the end of the rise or point of de-gas, also known as health bubbles, was recorded. The foams were placed in an air-circulated oven at 180° C. for 2 hours. The foam was then removed from the oven, allowed to cool, and then cut to observe any pinking or discoloration. Samples were cut 2"×2"×1" and the air flow through the foam was measured with the use of a Model CS145P-062 air flow meter manufactured by Custom Scientific Instruments, Inc., of Cedar Knolls, N.J.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

What is claimed is:

1. A catalyst composition useful in producing a polyurethane foam which catalyst comprises:

a) a first material described by the general structure:

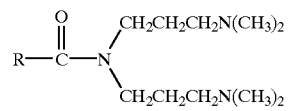

in which R may be hydrogen, or any alkyl, cycloalkyl, aryl, or alkylaryl group having from 1 to 20 carbon atoms, whether straight-chain, branched, saturated, or unsaturated; and b) N-methoxyethylmorpholine.

2. A catalyst according to claim 1 in which said first material is N,N-Bis[3-(dimethylamino)propyl]formamide.

3. A catalyst composition according to claim 1 further comprising:

c) 2,2'-oxybis(N,N-dimethylethanamine).

4. A catalyst composition according to claim 1 further comprising:

c) 2-((2-(dimethylamino)ethoxy)ethyl)methyl-amino)-ethanol.

5. A catalyst composition according to claim 1 wherein the vapor pressure of said composition is less than about 5 mm Hg @25° C.

6. A catalyst composition according to claim 1 wherein the vapor pressure of said composition is less than about 2 mm Hg @25° C.

7. A catalyst composition according to claim 1 wherein the vapor pressure of said composition is less than about 1 mm Hg @25° C.

8. A catalyst composition useful in producing a polyurethane foam which catalyst comprises:

a) a first material that is described by the general structure:

$$R-\overset{O}{\overset{\|}{C}}-N\overset{CH_2CH_2CH_2N(CH_3)_2}{\underset{CH_2CH_2CH_2N(CH_3)_2}{}}$$

in which R may be hydrogen, or any alkyl, cycloalkyl, aryl, or alkylaryl group having from 1 to 20 carbon atoms, whether straight-chain, branched, saturated, or unsaturated;
b) N-methoxyethylmorpholine; and
c) at least one other material selected from the group consisting of: 2,2'-oxybis(N,N-dimethylethanamine) or 2-((2 -(dimethylamino)ethoxy)ethyl)methyl-amino)-ethanol, wherein the vapor pressure of said composition is less than about 1 mm Hg @25° C.

9. A catalyst according to claim 8 in which said first material is N,N-Bis[3-(dimethylamino)propyl]formamide.

10. A process for producing a polyurethane foam which comprises the steps of:
a) providing a di-isocyanate;
b) providing a polyol; and
c) contacting said polyol with said di-isocyanate in the presence of a catalyst mixture which comprises:
  i) a first material that is described by the general structure:

$$R-\overset{O}{\overset{\|}{C}}-N\overset{CH_2CH_2CH_2N(CH_3)_2}{\underset{CH_2CH_2CH_2N(CH_3)_2}{}}$$

in which R may be hydrogen, or any alkyl, cycloalkyl, aryl, or alkylaryl group having from 1 to 20 carbon atoms, whether straight-chain, branched, saturated, or unsaturated; and
  ii) N-methoxyethylmorpholine; wherein the vapor pressure of said catalyst mixture is less than about 1 mm Hg @25° C.

11. A process according to claim 10 in which said first material comprises N,N-Bis[3-(dimethylamino)propyl]formamide.

12. A process for producing a polyurethane foam which comprises the steps of:
a) providing a di-isocyanate;
b) providing a polyol; and
c) contacting said polyol with said di-isocyanate in the presence of a catalyst mixture which comprises:
  i) a first material that is described by the general structure:

$$R-\overset{O}{\overset{\|}{C}}-N\overset{CH_2CH_2CH_2N(CH_3)_2}{\underset{CH_2CH_2CH_2N(CH_3)_2}{}}$$

in which R may be hydrogen, or any alkyl, cycloalkyl, aryl, or alkylaryl group having from 1 to 20 carbon atoms, whether straight-chain, branched, saturated, or unsaturated;
  ii) N-methoxyethylmorpholine; and
  iii) at least one other material selected from the group consisting of: 2,2'-oxybis(N,N-dimethylethanamine) or 2-((2 -(dimethylamino)ethoxy)ethyl)methyl-amino)-ethanol, wherein the vapor pressure of said catalyst mixture is less than about 1 mm Hg @25° C.

13. A process according to claim 12 in which said first material comprises N,N-Bis[3-(di methylamino)propyl]formamide.

14. A process according to claim 12 wherein said polyol is a polyester polyol.

15. A process according to claim 12 wherein said di-isocyanate is a di-isocyanate selected from the group consisting of: 4,4' diphenylmethane di-isocyanate and toluene di-isocyanate.

16. A cured polyurethane foam which comprises residual amounts of a catalyst combination, said catalyst combination comprising both:
i) a first material that is described by the general structure:

$$R-\overset{O}{\overset{\|}{C}}-N\overset{CH_2CH_2CH_2N(CH_3)_2}{\underset{CH_2CH_2CH_2N(CH_3)_2}{}}$$

in which R may be hydrogen, or any alkyl, cycloalkyl, aryl, or alkylaryl group having from 1 to 20 carbon atoms, whether straight-chain, branched, saturated, or unsaturated; and
ii) N-methoxyethylmorpholine,
  wherein the amount of said first material is any amount between 0.05 and 1.00% by weight based upon the total weight of said foam.

17. A process according to claim 16 in which said first material is N,N-Bis[3-(dimethylamino)propyl]formamide.

18. A cured polyurethane foam which comprises residual amounts of a catalyst combination, said catalyst combination comprising both:
i) a first material that is described by the general structure:

$$R-\overset{O}{\overset{\|}{C}}-N\overset{CH_2CH_2CH_2N(CH_3)_2}{\underset{CH_2CH_2CH_2N(CH_3)_2}{}}$$

in which R may be hydrogen, or any alkyl, cycloalkyl, aryl, or alkylaryl group having from 1 to 20 carbon atoms, whether straight-chain, branched, saturated, or unsaturated; and
ii) N-methoxyethylmorpholine,
  wherein the amount of N-methoxyethylmorpholine is any amount between 0.05 and 1.00% by weight based upon the total weight of said foam.

19. A process according to claim 18 in which said first material is N,N-Bis[3-(dimethylamino)propyl]formamide.

20. A composition from which a polyurethane polyester foam may be produced which comprises:
a) a polyol;
b) a first material that is described by the general structure:

$$R-\overset{O}{\overset{\|}{C}}-N\overset{CH_2CH_2CH_2N(CH_3)_2}{\underset{CH_2CH_2CH_2N(CH_3)_2}{}}$$

in which R may be hydrogen, or any alkyl, cycloalkyl, aryl, or alkylaryl group having from 1 to 20 carbon atoms, whether straight-chain, branched, saturated, or unsaturated; and c) N-methoxyethylmorpholine.

21. A process according to claim 20 in which said first material is N,N-Bis[3-(dimethylamino)propyl]formamide.

22. A composition from which a polyurethane polyester foam may be produced which comprises:

a) a polyol;

b) a first material that is described by the general structure:

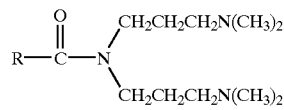

in which R may be hydrogen, or any alkyl, cycloalkyl, aryl, or alkylaryl group having from 1 to 20 carbon atoms, whether straight-chain, branched, saturated, or unsaturated;

c) N-methoxyethylmorpholine; and d) at least one other material selected from the group consisting of: 2,2'-oxybis(N,N-dimethylethanamine) or 2-((2 -(dimethylamino)ethoxy)ethyl)methyl-amino)-ethanol, wherein the vapor pressure of said composition is less than about 1 mm Hg @25° C.

23. A process according to claim 22 in which said first material is N,N-Bis[3-(dimethylamino)propyl]formamide.

* * * * *